United States Patent [19]
Huettner et al.

[11] Patent Number: 6,092,489
[45] Date of Patent: Jul. 25, 2000

[54] DOG TOY

[75] Inventors: Mark E. Huettner, Cave Creek; John P. Florance, Phoenix, both of Ariz.

[73] Assignee: Happy Dog Toys, LLC, Scottsdale, Ariz.

[21] Appl. No.: 09/010,045

[22] Filed: Jan. 20, 1998

[51] Int. Cl.[7] .................................................. A01K 29/00
[52] U.S. Cl. .......................................................... 119/707
[58] Field of Search .................................. 119/702, 707, 119/709, 710, 711; 446/125, 102, 383; 273/428, 146, 425, 426, 424; 425/542

[56] References Cited

U.S. PATENT DOCUMENTS

| | | | |
|---|---|---|---|
| 4,309,038 | 1/1982 | Spoon | 273/428 |
| 5,769,681 | 6/1998 | Greenwood, Sr. et al. | 446/120 |
| 5,897,417 | 4/1999 | Grey | 446/125 |

*Primary Examiner*—Thomas Price
*Attorney, Agent, or Firm*—Warren F. B. Lindsley; Frank J. McGue

[57] ABSTRACT

A molding and bonding process for incorporating hollow, flexible objects such as tennis balls in an injection molded thermoplastic body.

8 Claims, 1 Drawing Sheet

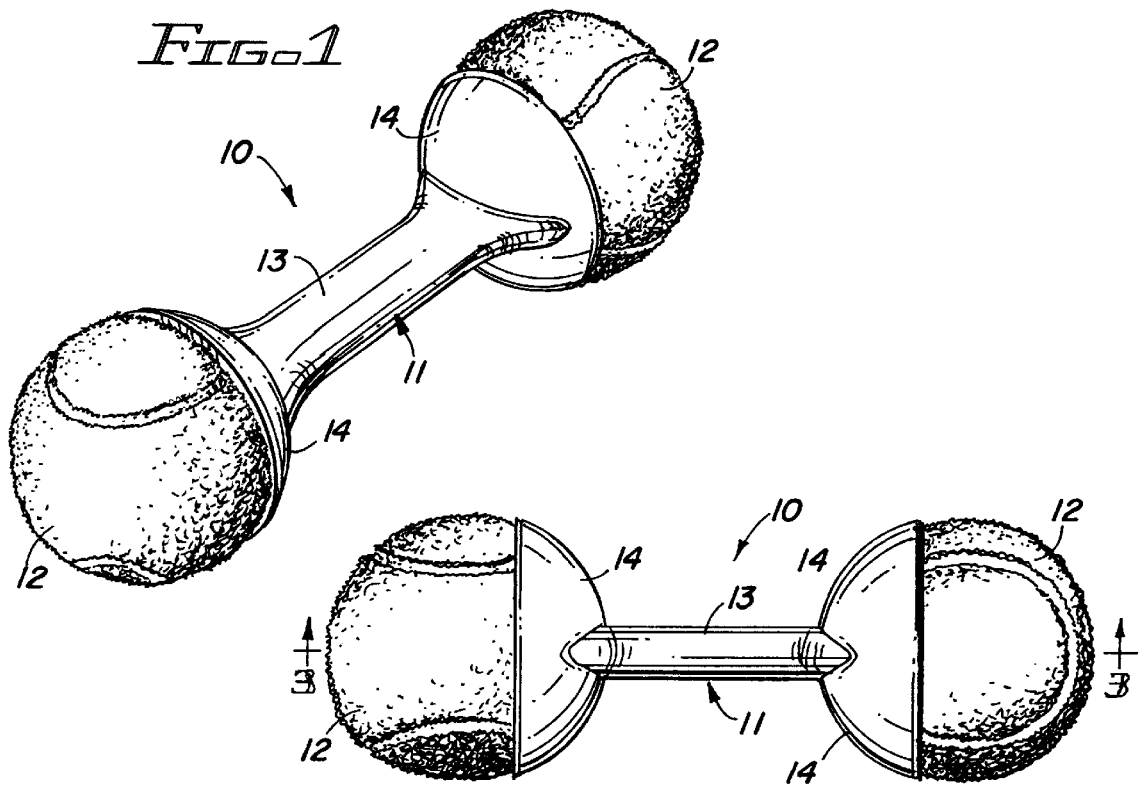
FIG-1
FIG-2
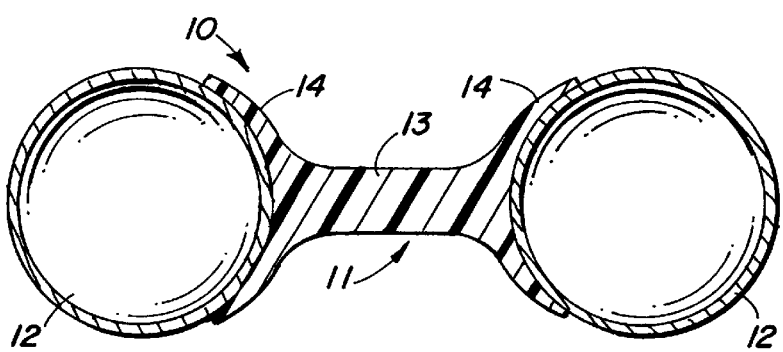
FIG-3
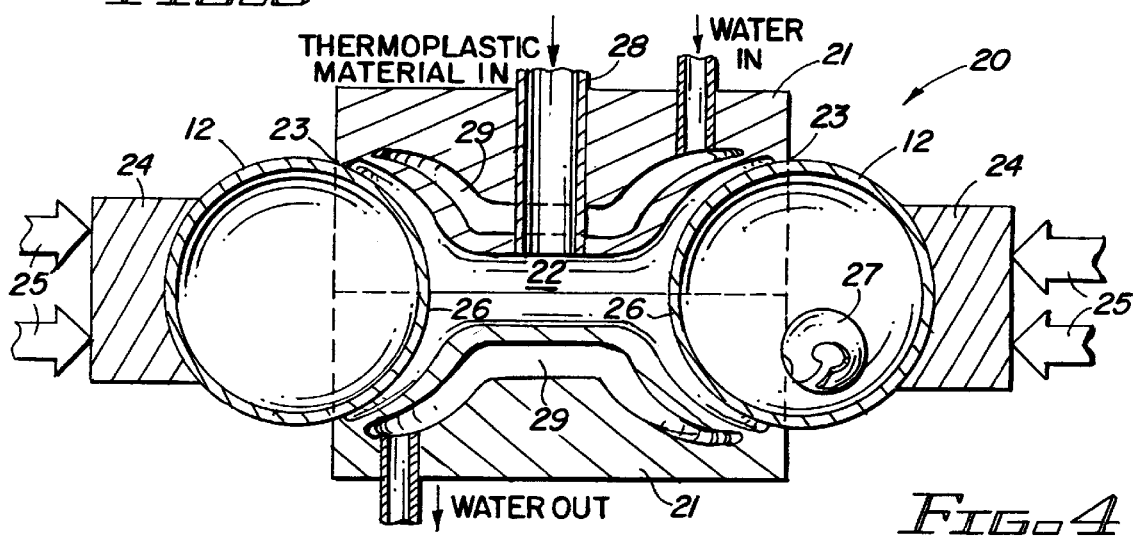
FIG-4

6,092,489

DOG TOY

BACKGROUND OF THE INVENTION

This invention relates to thermoplastic products incorporating flexible, hollow objects such as tennis balls which may or may not be pressurized and to a molding process for producing such products. An important characteristic of the new and novel process is its capability for bonding hollow, flexible objects to the thermoplastic body of a product.

DESCRIPTION OF THE PRIOR ART

Various types of molded thermoplastic products are known which incorporate different types of separately fabricated objects. Some such incorporated objects are secured to the thermoplastic body by adhesives such as urethanes, cyanoacrylates etc. Other non-plastic, non-pressurized, solid objects are sometimes inserted into an injection mold in a manner which allows the molten plastic to flow around a portion of the object, thereby trapping the object and holding it in place in the product. The use of adhesives for bonding is generally undesirable because of environmental concerns, and the entrapment method is often not a practical approach as it limits design configurations.

Applicants have filed Oct. 6, 1997 a design patent application Ser. No. 29/077,473 entitled Toy For Dogs on this subject matter. The ornamental design in this co-pending design application is embodied in an article fabricated by the method claimed below.

The molding and bonding method of the present invention is not known in the prior art as a means for securing flexible, hollow objects to a thermoplastic body.

SUMMARY OF THE INVENTION

This invention relates to a molding and bonding process for incorporating hollow, flexible objects such as tennis balls in an injection molded thermoplastic body and to products produced by the process.

It is, therefore, one object of this invention to provide a new and improved process for incorporating hollow, flexible objects in a molded plastic body.

Another object of this invention is to provide such a new and improved process which causes the hollow, flexible object to adhere reliably to the plastic body without the use of adhesives and without the use of entrapment as a securing means.

A further object of this invention is to provide such a new and improved molding and bonding process which achieves the desired bonding action simultaneously and along with the same injection molding operation that forms the molded body.

A still further object of this invention is to provide such a new and improved molding and bonding process which will reliably bond a tennis ball to a thermoplastic body.

A still further object of this invention is to provide a novel ornamental toy for a dog through the use of the improved molding and bonding method of this invention.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a perspective view of a product in the form of an ornamental toy for a dog, the toy having been produced by the molding and bonding process of this invention;

FIG. 2 is a front plan view of FIG. 1;

FIG. 3 is a cross-section view of FIG. 2 taken along line 3—3; and

FIG. 4 is a cross-section view showing the product of FIGS. 1–3 being formed in a mold in accordance with the improved molding and bonding process of the invention.

DESCRIPTION OF THE PREFERRED EMBODIMENT

Referring more particularly to the drawing by characters of reference, FIGS. 1–3 disclose a toy 10 for a dog, the toy being representative of the type of products that can be made using the molding and bonding process of this invention.

As shown in the drawing, toy 10 comprises a central supporting bar 11 with a tennis ball 12 secured at each end thereof, the ornamental configuration taking the fanciful or cartoon-like appearance of a bone with a joint at each end.

Bar 11, which is made of a tough, non-brittle, elastomeric, thermoplastic material, has a central span 13 with a cross-section that, in this particular example, approximates a flattened oval. Each end of span 13 terminates in a cup 14, the cup and attached span 13 figuratively resembling a shallow champagne glass and its stem. Cup 14 has an inside spherical surface (not a visible feature of the ornamental toy 10) generally conforming to that of tennis ball 12 so that the tennis ball fits snugly inside the cup as shown more clearly in sectional view of FIG. 3.

Toy 10 is intended for use as an object to be thrown and (hopefully) retrieved or "fetched" by a dog. In cases where a dog has learned to fetch this toy may be trained to grab bar 11 rather than one of the tennis balls, leaving the tennis balls free of dog saliva for the dog's master to grasp. The incorporation of tennis balls in the toy results in a lively toy that bounces when it lands on hard surfaces and will float when thrown in a pool or lake thereby attracting the dog and adding excitement to the fetching game.

The process by which an article, such as ornamental toy 10, is made in accordance with the improved molding and bonding process of the claimed invention is illustrated by the simplified diagram of FIG. 4.

FIG. 4 is a cross-sectional representation showing a molding apparatus 20 which is employed in the fabrication of a toy 10. As shown, the two tennis balls 12 are already in place for the molding process. The cross-section of FIG. 4 is taken in the vicinity of the parting plane of the mold.

As shown in FIG. 4, a temperature controlled mold 21 encloses a cavity 22 into which the molten thermoplastic material is to be injected. Mold 21 encloses the surfaces of cavity 22 that correspond with the surfaces of bar 11 which are exposed in the final product. Circular openings 23 at the left and right ends of the mold (as shown in FIG. 4) are filled by the tennis balls 12. The tennis balls are held firmly in place against openings 23 by pressure blocks 24, the pressure blocks being urged in the direction of arrows 25.

With cavity 22 completely enclosed, a molten thermoplastic material, preferably a thermoplastic polyurethane elastomer with a durometer between 83A and 90A, is injected through plastic input tubes 28 into the temperature controlled mold through water chamber 29. As cavity 22 is filled, the molten thermoplastic material penetrates the fibrous covering 26 of tennis balls 12, completely enveloping the fibers and bonding to the fibers as well as to the flexible elastic body of the tennis balls to which the fibrous covering is bonded.

Upon completion of the injection procedure, the injected material is allowed to cool and solidify. The mold is then opened and the finished product is removed.

In accordance with the stated objects of the invention, a single-process molding and bonding operation is thus provided, the bonding being accomplished without the use of adhesives or bodily entrapment of incorporated parts.

It should be noted that a tennis ball may contain a movable object such as a bell 27 in its hollow interior for producing a noise to excite the dog.

What is claimed is:

1. A method for producing a product comprising one or more flexible objects incorporated in and bonded to an injection molded thermoplastic body, the method comprising the steps of:

clamping said one or more flexible, objects against one or more strategically placed openings in a temperature controlled mold such that the portion of said object's surface that is to be bonded forms a part of the inner surface of the mold and is exposed to the injected thermoplastic material, injecting a molten thermoplastic material into the mold, allowing the thermoplastic material to cool and solidify, opening the mold, and removing the finished product.

2. The method set forth in claim 1 wherein said objects comprise hollow flexible internally pressurizable objects.

3. The method set forth in claim 1 wherein:

said thermoplastic material is a thermoplastic polyurethane elastomer with a durometer between 83A and 90A.

4. The method set forth in claim 2 wherein:

said one or more hollow, flexible, internally pressurized objects have fibrous outer surfaces which absorb the molten thermoplastic material and enhance the bonding action.

5. The method set forth in claim 2 wherein:

said one or more hollow, flexible, internally pressurizable objects are tennis balls.

6. The method set forth in claim 2 wherein:

said temperature controlled mold forms the exposed surfaces of the thermoplastic body of the finished product, said strategically placed openings allow said molten thermoplastic material to flow over those surfaces of said one or more hollow, flexible, internally pressurizable objects which are intended to be bonded to said thermoplastic body, and said thermoplastic material bonds to said exposed surfaces of said one or more hollow, flexible, internally pressurizable objects as said thermoplastic material cools and solidifies.

7. An article produced by the method of claim 2 wherein:

said one or more hollow, flexible, internally pressurizable objects comprise at least one tennis balls, and said thermoplastic body comprises a central supporting bar with a cup at each end for receiving and bonding to said two tennis balls.

8. The article of claim 7 in further combination with a noise maker loosely contained within one of the tennis balls.

* * * * *